US011725438B2

(12) United States Patent
Tsorng et al.

(10) Patent No.: US 11,725,438 B2
(45) Date of Patent: Aug. 15, 2023

(54) DOOR-HOLDER MECHANISM FOR TELECOMMUNICATION DEVICES

(71) Applicant: Quanta Computer Inc., Taoyuan (TW)

(72) Inventors: Yaw-Tzorng Tsorng, Taoyuan (TW); Ming-Lung Wang, Taoyuan (TW); Kai-Hsiang Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 310 days.

(21) Appl. No.: 17/248,269

(22) Filed: Jan. 15, 2021

(65) Prior Publication Data

US 2022/0112752 A1    Apr. 14, 2022

Related U.S. Application Data

(60) Provisional application No. 63/089,202, filed on Oct. 8, 2020.

(51) Int. Cl.
| | |
|---|---|
| *E05D 11/10* | (2006.01) |
| *E05D 3/02* | (2006.01) |
| *H02B 1/38* | (2006.01) |
| *H02B 1/46* | (2006.01) |
| *H02G 3/14* | (2006.01) |

(52) U.S. Cl.
CPC .......... *E05D 11/1014* (2013.01); *E05D 3/022* (2013.01); *H02B 1/38* (2013.01); *H02B 1/46* (2013.01); *H02G 3/14* (2013.01); *E05Y 2900/606* (2013.01)

(58) Field of Classification Search
CPC ....... E05D 11/1014; E05D 3/022; H02B 1/38; H02B 1/46; H02G 3/14; E05Y 2900/606

USPC ........................................ 220/831, 832, 4.23
See application file for complete search history.

(56) References Cited

U.S. PATENT DOCUMENTS

| | | | | |
|---|---|---|---|---|
| 1,505,192 A | * | 8/1924 | Gervais, Jr. ......... | E05D 11/1007 16/351 |
| 5,141,124 A | * | 8/1992 | Smith ..................... | E05D 11/06 220/908 |
| 5,320,232 A | * | 6/1994 | Maguire ............ | B65D 47/0861 220/849 |
| 5,992,681 A | * | 11/1999 | Byrd ..................... | E05D 7/1072 220/831 |
| 7,100,791 B2 | * | 9/2006 | Berger ................. | B65F 1/1473 220/908 |

(Continued)

FOREIGN PATENT DOCUMENTS

| | | | | |
|---|---|---|---|---|
| DE | 19841274 A1 | * | 3/2000 | ............ E05D 3/022 |
| WO | WO-2011145694 A1 | * | 11/2011 | ............ B60R 5/044 |
| WO | WO-2017010897 A1 | * | 1/2017 | ......... E05D 11/1014 |

*Primary Examiner* — J. Gregory Pickett
*Assistant Examiner* — Niki M Eloshway
(74) *Attorney, Agent, or Firm* — Nixon Peabody LLP

(57) ABSTRACT

A telecommunication device includes a main body to which a compartment is attached for receiving one or more components. A door is rotatable relative to the compartment between a closed position and a plurality of open positions. The door covers the compartment in the closed position. A connecting assembly attaches the door to the compartment, and includes a locking mechanism for preventing rotation of the door in a fixed position. The fixed position corresponds to an open position of the plurality of open positions. The locking mechanism self-locks in the fixed position when the door rotation reaches the fixed position.

15 Claims, 18 Drawing Sheets

(56) References Cited

U.S. PATENT DOCUMENTS

| | | | | |
|---|---|---|---|---|
| 7,658,295 B2* | 2/2010 | Hoepner | ............ | B65D 47/0885 |
| | | | | 220/254.5 |
| 2013/0084050 A1* | 4/2013 | Vastmans | ............... | H04Q 1/025 |
| | | | | 361/679.01 |
| 2013/0228569 A1* | 9/2013 | Jolly | ........................ | H02G 3/14 |
| | | | | 220/3.8 |

* cited by examiner

DOOR-HOLDER MECHANISM FOR TELECOMMUNICATION DEVICES

CROSS-REFERENCE TO RELATED APPLICATIONS

This application claims priority under 35 U.S.C. § 119 to U.S. Provisional Application No. 63/089,202, entitled "A DOOR HOLDER MECHANISM FOR TELECOM DEVICES," and filed on Oct. 8, 2020. The contents of that application are hereby incorporated by reference in their entirety.

FIELD OF THE INVENTION

The present invention relates generally to a telecommunication device, and more specifically, to holding a compartment door in a fixed position.

BACKGROUND OF THE INVENTION

Telecommunication devices, such as base stations for cellular networks, typically have maintenance compartments for holding various components. The maintenance compartments protect the components from adverse environmental conditions and unauthorized access. Specifically, a compartment door covers the maintenance compartment to enclose the components and protect them from external elements.

When accessing the maintenance compartment, the compartment door is rotated between a closed position and an open position, freely swinging back and forth. The unrestricted rotation of the compartment door poses a high risk, potentially hitting and damaging the internal components.

The present disclosure is directed to a connecting assembly that, among other benefits, provides a solution to holding a door for a telecommunication device in an open, fixed position.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings and each claim.

According to one embodiment of the present disclosure, a telecommunication device includes a main body, a compartment, a door, and a connecting assembly. The compartment is attached to the main body for receiving one or more components. The door is rotatable relative to the compartment between a closed position and a plurality of open positions. The door covers the compartment in the closed position. The connecting assembly attaches the door to the compartment. The connecting assembly includes a locking mechanism for preventing rotation of the door in a fixed position. The fixed position corresponds to an open position of a plurality of open positions. The locking mechanism is self-locking in the fixed position when the door rotation reaches the fixed position.

According to an implementation of the above embodiment, the telecommunication device is a base station for a cellular network. According to another implementation of the above embodiment, the one or more components include one or more components selected from a group consisting of an output cable, a light emitting diode (LED) indicator, and a maintenance button. According to yet another implementation of the above embodiment, the compartment is selected from a group consisting of a maintenance box and a cable-routing box.

According to yet another implementation of the above embodiment, the connecting assembly includes a hinge pin and a hinge base. The hinge base includes two base plates between which the hinge pin is rotatably mounted. According to a configuration of this implementation, the locking mechanism includes a lock key and a lock aperture. The lock key is formed on at least one end of the hinge pin. The lock aperture is formed on at least one of the base plates.

According to an aspect of the above configuration, the lock key is received within the lock aperture when rotation of the door causes alignment between the lock key and the lock aperture. According to an example of this aspect, the lock key is received within the lock aperture in response to force of gravity.

According to another aspect of the above configuration, the lock key includes a first key and a second key. The first key is received within the lock aperture when the hinge pin is in a generally horizontal orientation. The second key is received within the lock aperture when the hinge pin is in a generally vertical orientation.

According to an example of the above aspect, the first key extends from an end of the hinge pin at a first distance, and the second key extends from the end of the hinge pin at a second distance. The first distance is greater than the second distance.

According to another example of the above aspect, the first key has a circular main body from which a locking tab extends. The locking tab is centrally positioned relative to a center point of the main body. The locking tab is narrower than a body diameter of the main body.

According to an option of the above example, the end of the hinge pin has an outer circular periphery that has an outer diameter. The outer diameter is greater than the body diameter. According to another option of the above example, the second key is oriented at a different angle relative to the first key. The angle is in a perpendicular end plane relative to a central axis of the hinge pin. The second key has an outer circular surface with a second key diameter that is generally the same as the outer diameter.

According to yet another aspect of the above configuration, the lock aperture is continuously connected to a pin aperture, the end of the hinge pin being inserted through the pin aperture. According to an example of this aspect, the lock aperture has a cross-sectional width that is smaller than a hinge diameter of the pin aperture.

According to another embodiment of the present disclosure, a telecommunication device includes a main body, a compartment, a door, and a connecting assembly. The compartment is attached to the main body for receiving one or more components. The door is rotatable relative to the compartment between a closed position and a plurality of open positions. The door covers the compartment in the closed position. The connecting assembly attaches the door to the compartment, and includes a hinge base, a hinge pin, a first key, and a second key. The hinge base has two base plates that are fixed in generally parallel positions relative to each other. The two base plates are generally identical to and offset from each other. Each base plate has a pin aperture continuously connected to a lock aperture. The hinge pin has a cylindrical body extending between two opposing ends. Each of the two opposing ends is rotatably inserted through a respective pin aperture. The first key extends from each end of the hinge pin along central axis. The second key extends from each end of the hinge pin along the central axis. The second key is oriented at a different angle than the first key in a perpendicular end plane relative to the central axis. The second key extends a smaller distance than the first key.

According to an implementation of the above embodiment, the first key is received within the lock aperture in response to the force of gravity. The first key is received when rotation of the hinge pin causes alignment between the first key and the lock aperture.

According to another implementation of the above embodiment, the second key is received within the lock aperture in response to the force of gravity. The second key is received when rotation of the hinge pin causes alignment between the second key and the lock aperture.

According to yet another implementation of the above embodiment, the first key has a first outer periphery defined in part by a first diameter. The second key has a second outer periphery that is defined in part by a second diameter. The second diameter is greater than the first outer periphery.

According to yet another implementation of the above embodiment, the first key extends along the central axis a greater distance than the second key.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

Figure 1A:
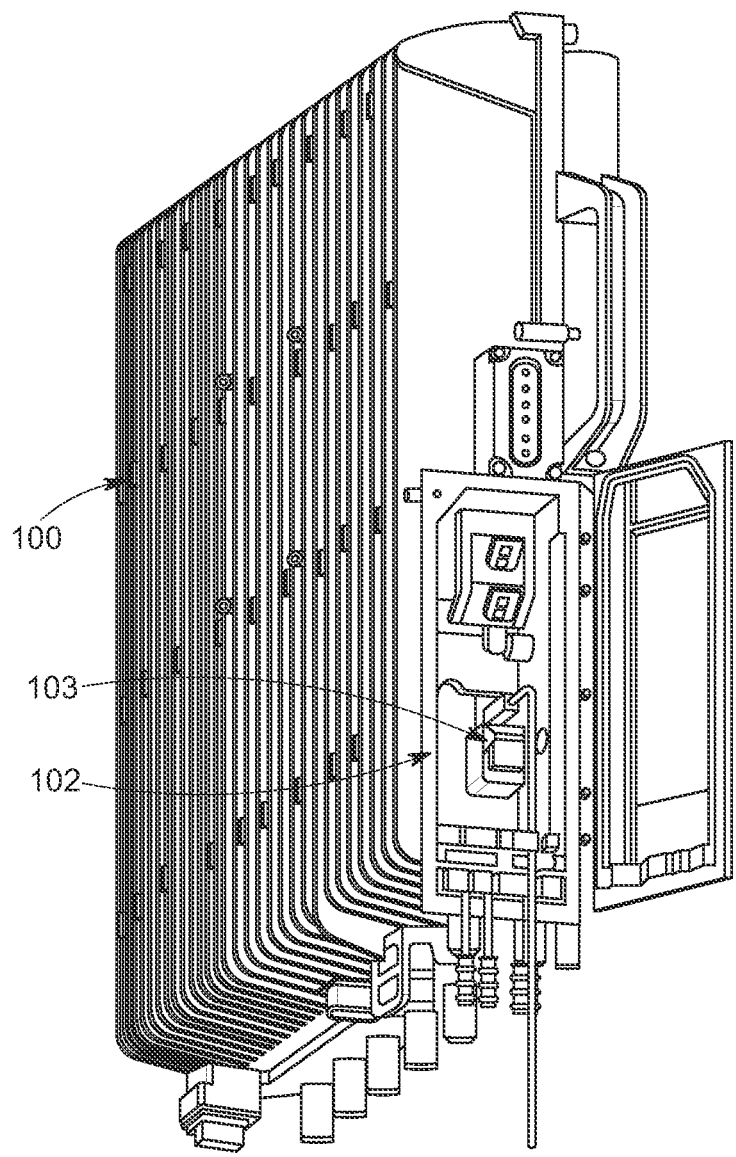
FIG. 1A is perspective view showing a prior telecommunication device with a vertical compartment.

While the invention is susceptible to various modifications and alternative forms, specific implementations have been shown by way of example in the drawings and will be described in further detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Various embodiments are described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example. Similarly, terms "vertical" or "horizontal" are intended to include "within 3-5% of" a vertical or horizontal orientation, respectively.

Referring to FIG. 1A, a prior telecommunication device 100 has a maintenance box 102 that is oriented in a vertical configuration (i.e., longer dimension is vertical). The maintenance box encloses various internal components 103, and is accessible for upgrading or servicing the components 103.

Figure 1B:
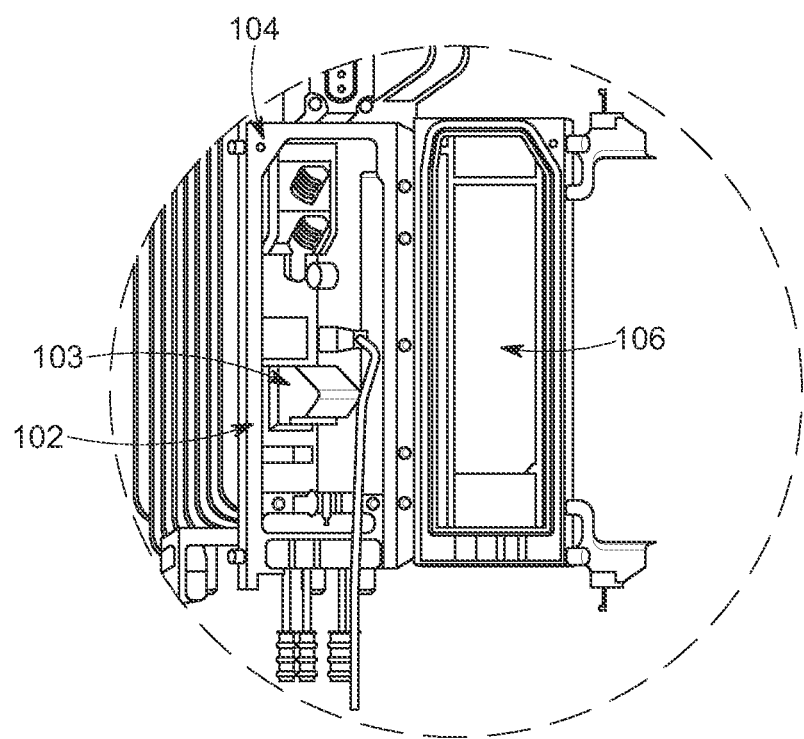
FIG. 1B is an enlarged view of the compartment of FIG. 1A.

Referring to FIG. 1B, the maintenance box 102 has a base 104 to which a door 106 is hingedly attached. The door is attached in a vertical configuration, rotating in a horizontal plane. In a closed position, the door 106 is placed in contact with the base 104. When access is required, the door 106 is rotated in a clockwise direction away from the base 104. However, the door 106 is free to rotate unrestricted, being able to potentially slam back on the base 104 during a service procedure. Consequently, the door 106 is likely to potentially damage the components 104 or cause harm to an operator's hands.

Figure 2A:
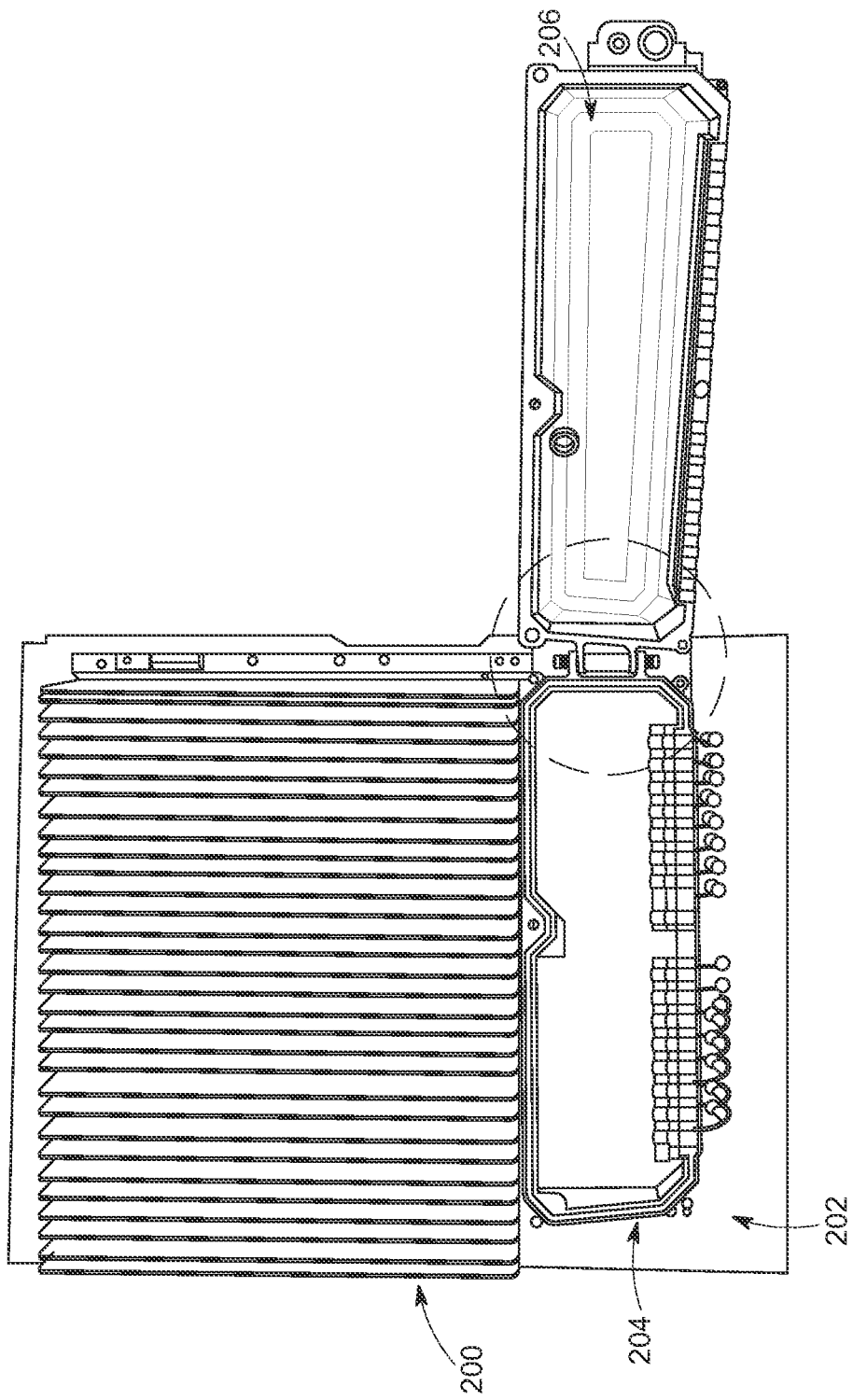
FIG. 2A is a side view of another prior telecommunication device having a horizontal compartment.

Referring to FIG. 2A, another prior telecommunication device 200 has a maintenance box 202 that is oriented in a horizontal configuration (i.e., longer dimension is horizontal). The maintenance box 202 has a base 204 to which a door 206 is attached.

Figure 2B:
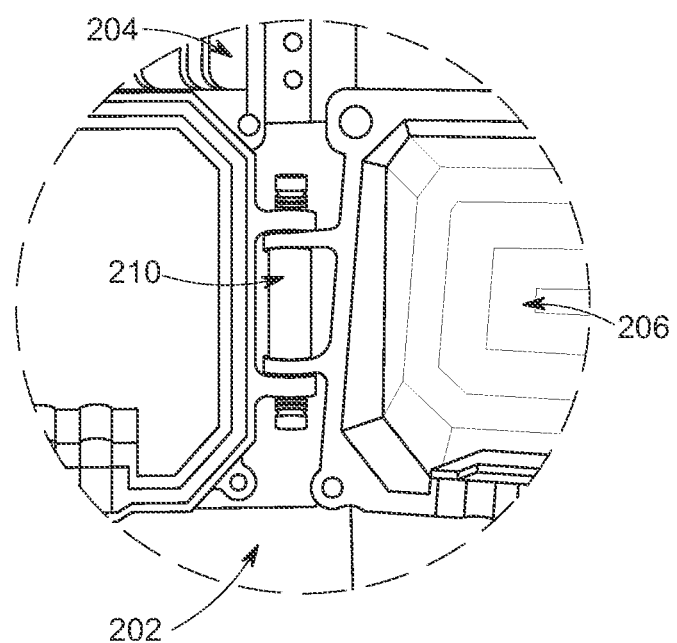
FIG. 2B is an enlarged view of a connecting assembly for the compartment of FIG. 2A.

Referring to FIG. 2B, the door 206 is attached to the base 204 via a hinge 210. Similar to the problem described above in reference to FIGS. 1A and 1B, the hinge 210 fails to prevent undesired rotation of the door 206. When accessing the maintenance box 202, the door 206 lacks any restriction in rotating back-and-forth, which can cause potential damage or harm.

Figure 3A:
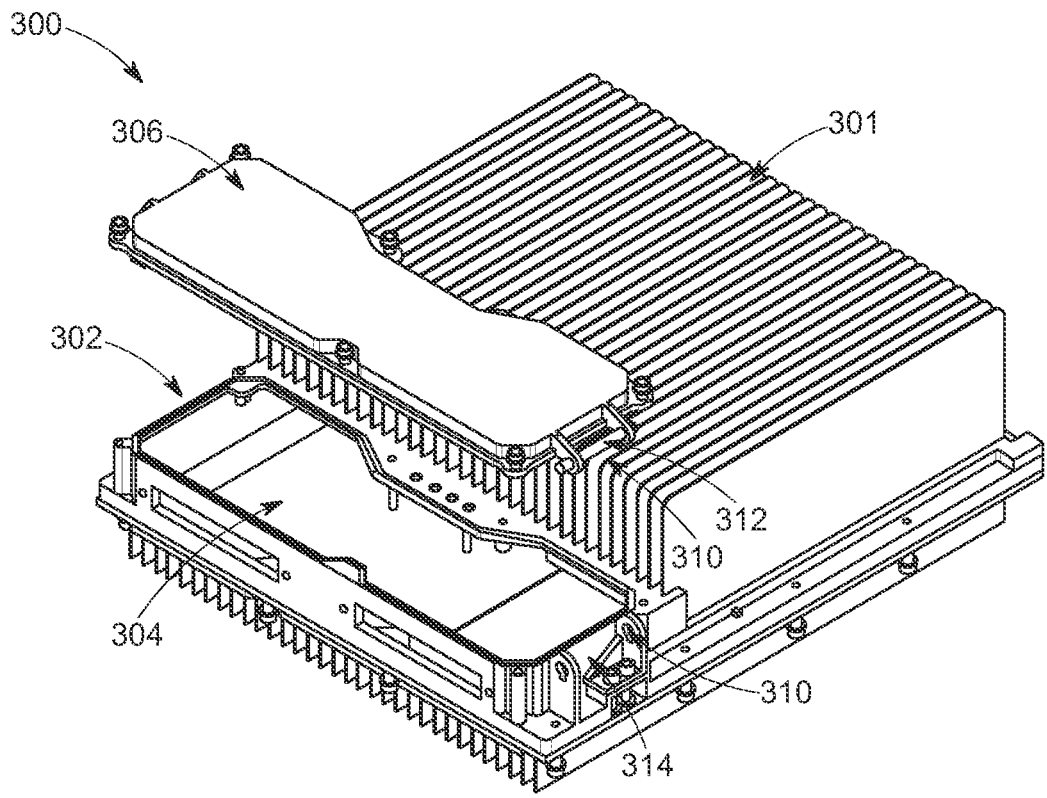
FIG. 3A is an exploded perspective view of a telecommunication device, in accordance with one embodiment of the present disclosure.
Figure 3B:
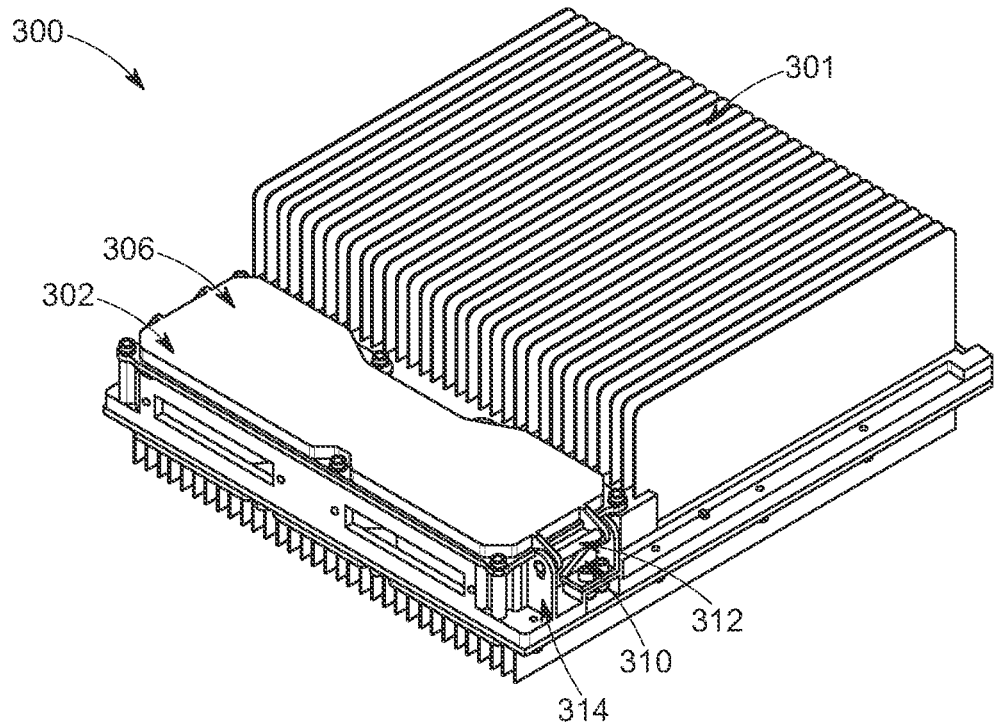
FIG. 3B is an assembly perspective view of the telecommunication device of FIG. 3A.

Referring to FIGS. 3A and 3B, a telecommunication device 300 ("telecom device") is illustrated in accordance with one embodiment of the present disclosure. According to one example, the telecommunication device is a base station for a cellular network. The telecom device 300 includes a main body 301 to which a compartment 302 is attached. The compartment 302 is configured for receiving one or more internal components, such as those described above in reference to FIGS. 1A and 1B. The compartment 302 is in the form of a maintenance box or a cable-routing box, according to some examples.

The compartment 302 includes a base 304 to which a door 306 is attached via a connecting assembly 310. The base 302 is generally the surface that contacts the door 306 in a closed position (illustrated in FIG. 3B), in which the door 306 covers the compartment 302. The connecting assembly 310 includes a pin assembly 312 and a base assembly 314, which interact to facilitate rotating and locking of the door 306 relative to the compartment 302 (as described in more detail below).

Figure 4A:
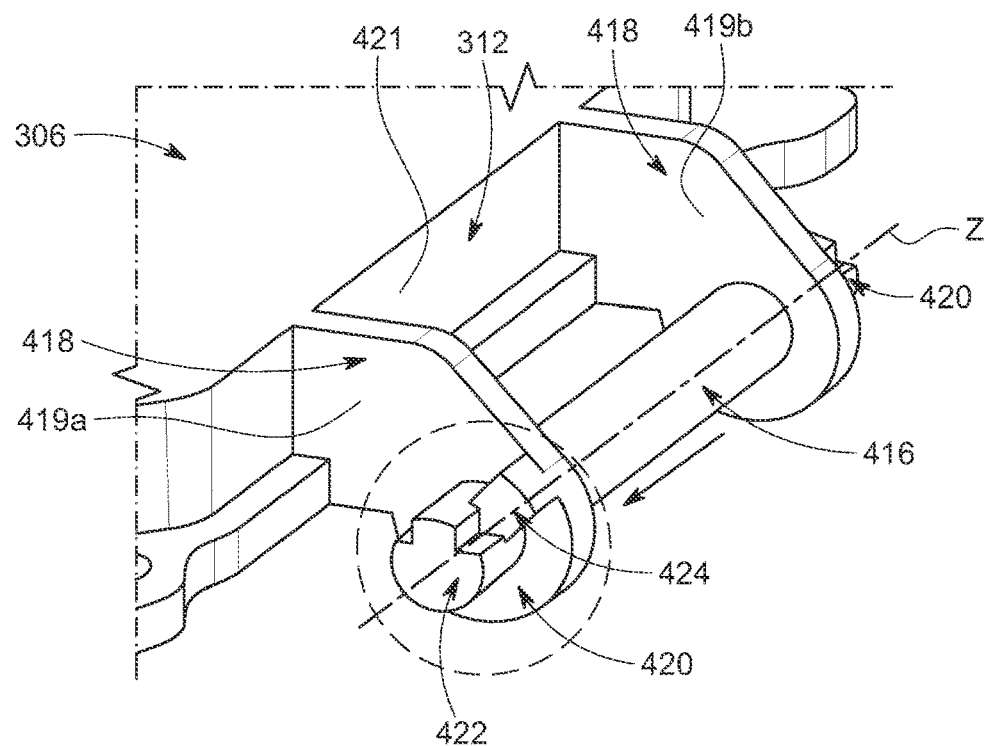
FIG. 4A is a perspective of a hinge pin of the telecommunication device of FIG. 3A.

Referring to FIG. 4A, the pin assembly 312 includes a hinge pin 416 fixedly attached between two parallel pin plates 418. Each pin plate 418 has an external surface 419a and an internal surface 419b, and extends outward away from a rear surface 421 of the door 306. The pin plates 418 are offset from each other along a central axis Z of the hinge pin 416.

The hinge pin 416 has a lock key 420 at each end. The lock key 420 extends outwardly, along the central axis Z, from the external surface 419a of the respective pin plate 418. The external surface 419a of the pin plate 418 generally defines the end of the hinge pin 416. Each lock key 420 includes a first key 422 and a second key 424. In alternative embodiments, the lock key 420 includes only one of the first key 422 and the second key 424. Each of the first and second keys 422, 424 is described in more detail below.

Figure 4B:
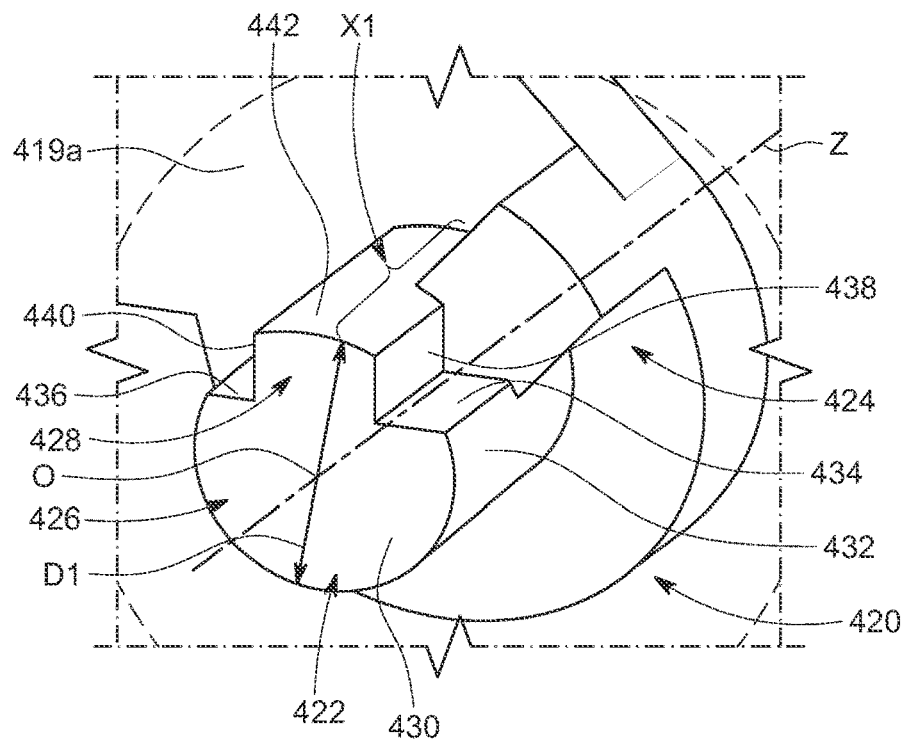
FIG. 4B is an enlarged view illustrating one end of the hinge pin of FIG. 4A.

Referring to FIG. 4B, the first key 422 of the lock key 420 extends from the end of the hinge pin 416 (i.e., from the external surface 419a) a distance X1, along the central axis Z. The first key 422 has a circular main body 426 from which a locking tab 428 extends. The main body 426 has a body diameter D1 with a center point O. The main body 426 has an end surface 430 that is perpendicular to the central axis Z, and which defines the end point of distance X1. The main body 426 further has a transverse, circular surface 432 that extends along the central axis Z the distance X1. The circular surface 432 ends in two flat surfaces 434, 436 that extend inward towards the locking tab 428.

The locking tab 428 is centrally positioned relative to the center point O of the main body 426, forming a general mushroom-shape with the main body 426. As illustrated in FIG. 4B, the mushroom-shape is represented upside down. Thus, the locking tab 428 is narrower than the diameter D1 (i.e., the body diameter) of the main body. The locking tab 428 is defined by two lateral surfaces 438, 440, which are perpendicular and continuous, respectively, with the flat surfaces 434, 436. The locking tab 428 is further defined by a top surface 442, which extends between the lateral surfaces 438, 440.

Optionally, the top surface 442 has the same diameter D1 as the main body 426. In other words, in accordance with an exemplary embodiment, the first key 422 has a shape that is initially a fully circular body of diameter D1. Two sections are then removed from the areas outward of the intersection between the two flat surfaces 434, 436 and the corresponding lateral surface 438, 440. The second key 424 is formed in one of these sections, at the intersection between a first flat surface 434 and a first lateral surface 438, as described in more detail below.

Figure 4C:
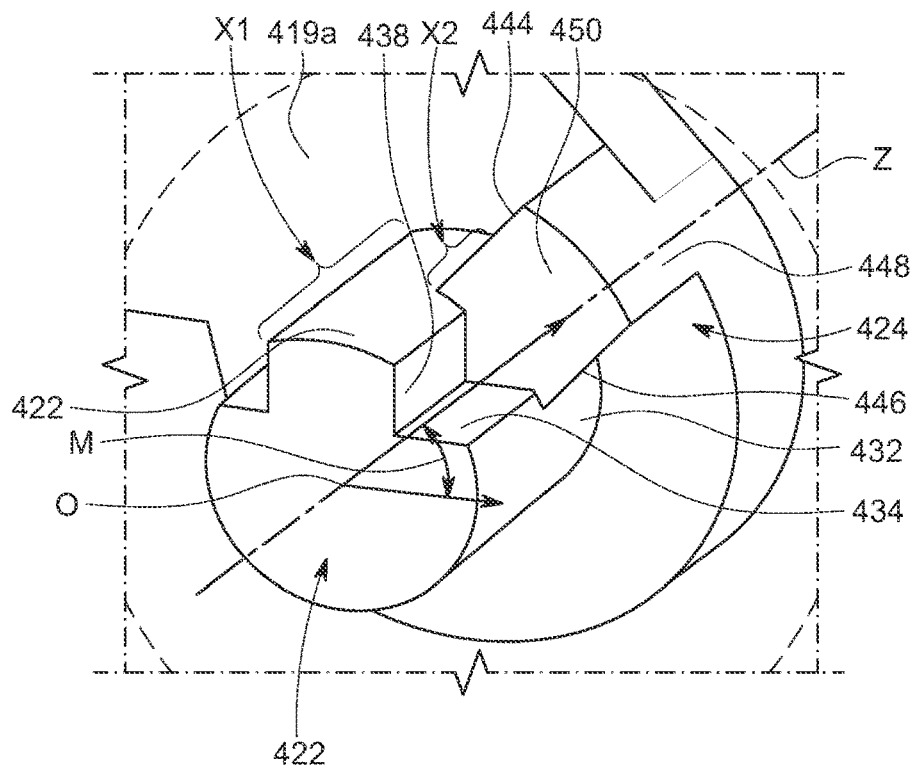
FIG. 4C is another enlarged view of the end of the hinge pin of FIG. 4A.

Referring to FIG. 4C, the second key 424 is oriented at a different angle relative to the first key 422, between the intersecting first flat surface 434 and the first lateral surface 438. In the illustrated example, the second key 424 is oriented at an approximately 45-degree angle M relative to the first key 422, and more specifically, relative to the first flat surface 434. The angle M is in a perpendicular end plane relative to the central axis Z.

The second key 424 extends from the end of the hinge pin 416 (i.e., from the external surface 419a) a distance X2, along the central axis Z. The distance X1 of the first key 422, is greater than the distance X2 of the second key 424.

The second key 424 is defined by two lateral surfaces 444, 446, which extend, respectively, from the top surface 442 and the circular surface 432 of the first key 422. The two lateral surfaces 444, 446 are contiguous with a top surface 448, which extends the distance X2 along the central axis Z. The two lateral surfaces 444, 446 are further contiguous with an end surface 450 that is perpendicular to the central axis Z, and which defines the end point of distance X2.

Figure 4D:
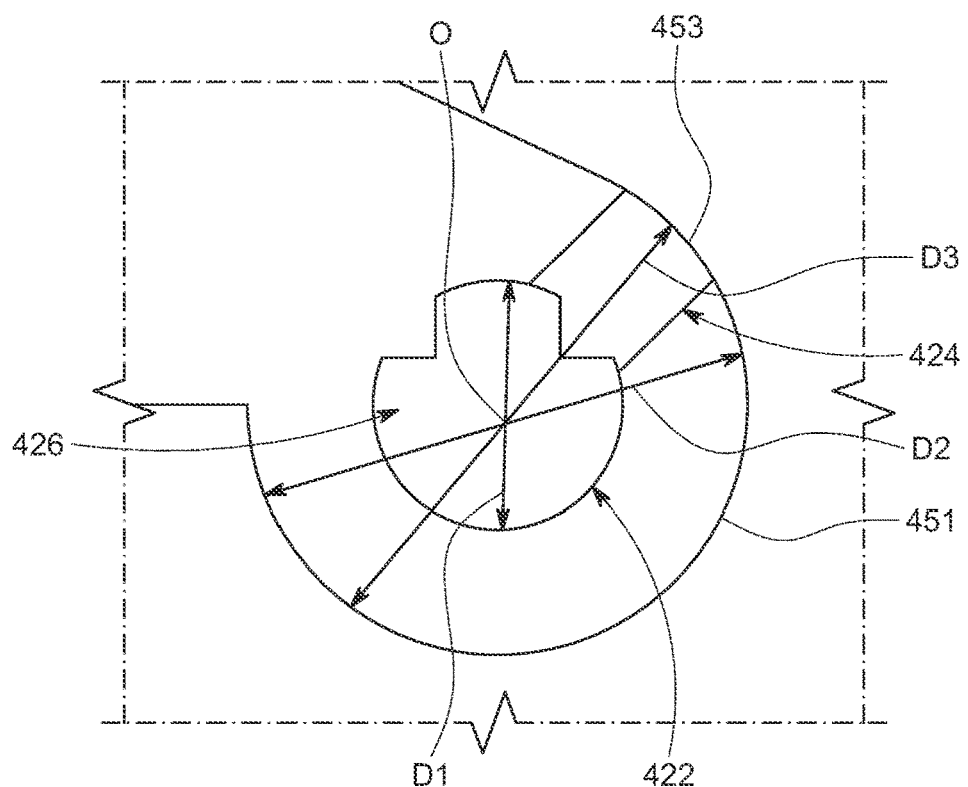
FIG. 4D is a side view illustrating the end of the hinge pin of FIG. 4A.

Referring to FIG. 4D, the center point O is optionally also a center point for an outer circular periphery 451 of the end of the hinge pin 416 (illustrated in FIG. 4A). The outer circular periphery 451 has an outer diameter D2 that is greater than the body diameter D1 of the main body 426, which is part of the first key 422. As illustrated, the outer circular periphery 451 is contiguous with an outer circular surface 453 of the second key 424. The outer circular surface 453 has a second key diameter D3, which is generally the same as the outer diameter D2 in the illustrated embodiment. In alternative embodiments, the second key diameter D3 is smaller or larger than the outer diameter D2.

Figure 5A:
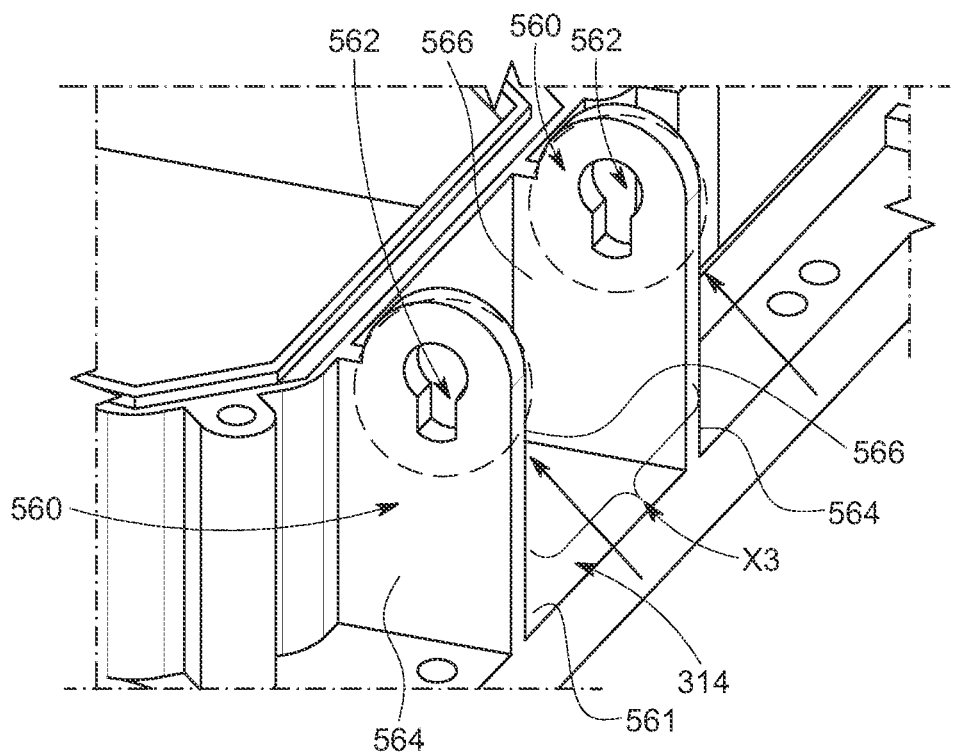
FIG. 5A is perspective view of a hinge base of the telecommunication device of FIG. 3A.

Referring to FIG. 5A, the base assembly 314 includes two base plates 560 that are separated from each other by a hinge base 561. Each base plate 560 has a hinge aperture 562, which extends from an external surface 564 to an internal surface 566 of each base plate 560. The hinge aperture 562 is described in more detail below.

Figure 5B:
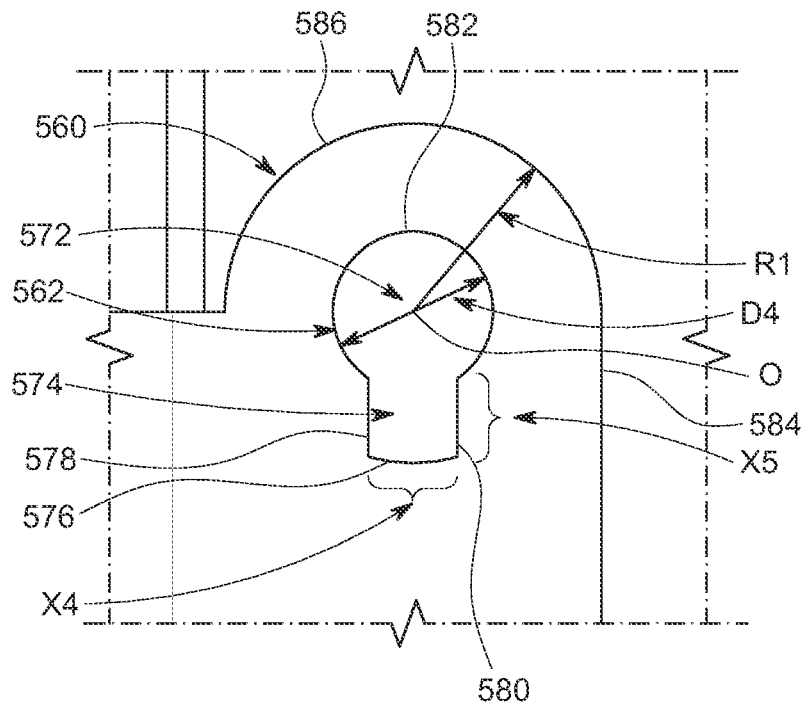
FIG. 5B is a side view of the hinge base of FIG. 5A.

Referring to FIG. 5B, the hinge aperture 562 includes a pin aperture 572 and a lock aperture 574. The end of the hinge pin 416 (illustrated in FIG. 4A) is inserted and received through the pin aperture 572. The lock aperture 574 is continuously connected to the pin aperture 572, but has a different shape than the pin aperture 572. The pin aperture 572 has a hinge diameter D4 with its center point being the center point O.

The lock aperture 574 is defined by a bottom surface 576 from which opposing, lateral surfaces 578, 580 extend and connect to an internal surface 582 of the pin aperture 572. The lock aperture 574 has a cross-sectional width X4 that is smaller than the hinge diameter D4 of the pin aperture 572. The lock aperture 574 extends a distance X5 away from a bottom end of the pin aperture 572.

The base plate 560 is defined, along its cross-section, by a straight external surface 584 that is continuous with a circular external surface 586. The circular external surface 586 has a radius R1, which is larger than a radius of the hinge diameter D4 (i.e., R1>D4/2). The radius R1 has a center that is at the center point O.

Referring generally to FIGS. 6A-6D, the door 306 is illustrated and described in reference to different open, but unfixed (or unlocked), positions. The pin assembly 312 rotates relative to the base assembly 314, as the door 306 rotates between several positions. Specifically, the door 306 rotates between the closed position (illustrated in FIG. 3B) and one or more open positions (described below).

Figure 6A:
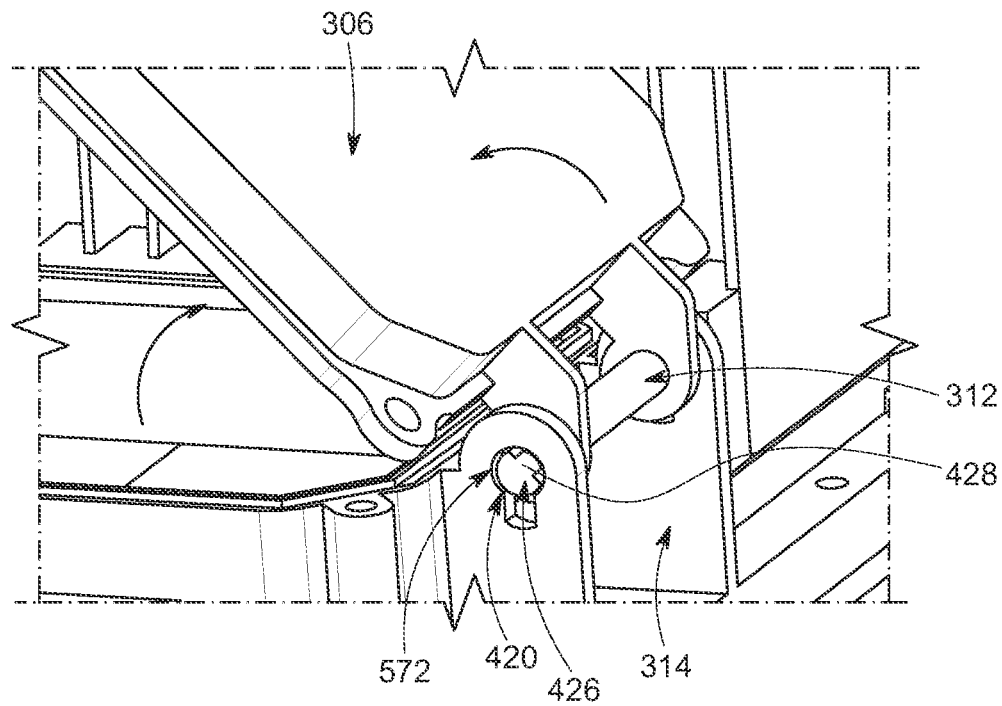
FIG. 6A is a partial perspective view of the telecommunication device of FIG. 3A illustrating a door in a first open position, the telecommunication device being in a horizontal configuration.
Figure 6B:
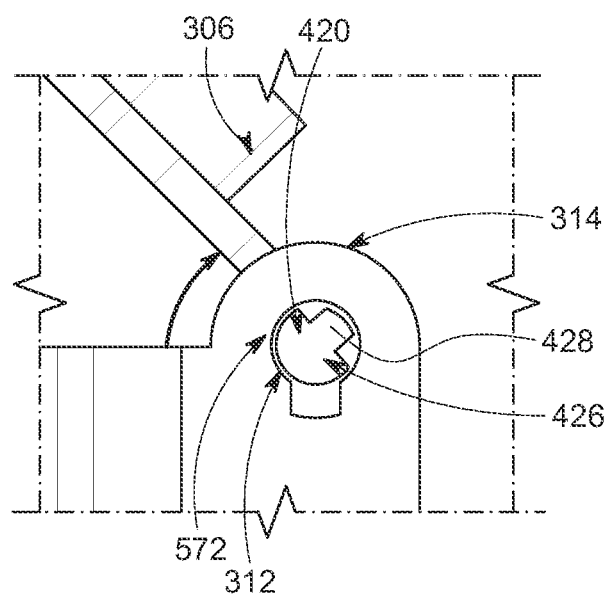
FIG. 6B is a partial side view representing the first open position of FIG. 6A.

Referring specifically to FIGS. 6A and 6B, the door 306 is in a first open position. In this position, the lock key 420 is rotated clockwise from the closed position (illustrated in FIG. 3B) to a position approximately 45 degrees from the closed position. The main body 426 rotates within the pin aperture 572, with the locking tab 428 being secured within the pin aperture 572.

Figure 6C:
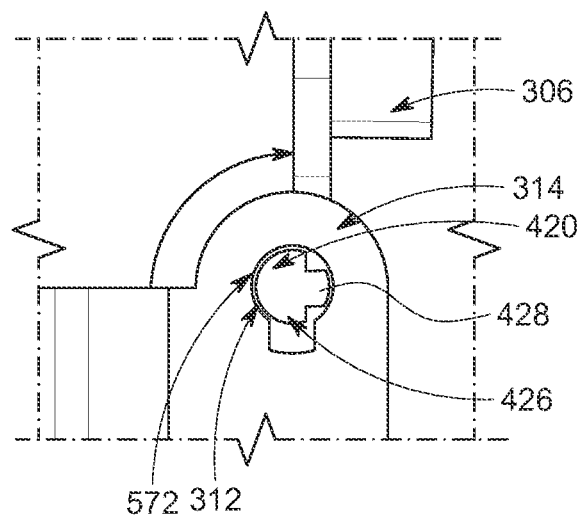
FIG. 6C is a partial side view representing a second open position of the door of FIG. 6A.

Referring specifically to FIG. 6C, the door 306 is in a second open position. In this position, the lock key 420 is rotated to an approximately 90-degree angle from the closed position. Here, the main body 426 continues to rotate within the pin aperture 572, with the locking tab 428 continuing to be secured within the pin aperture 572.

Figure 6D:
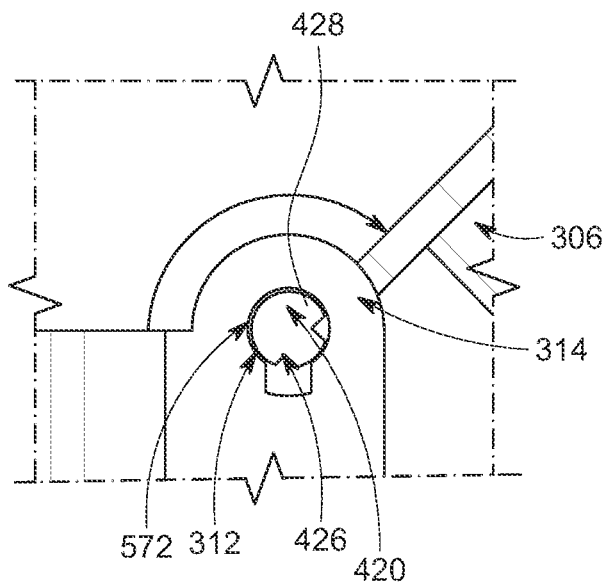
FIG. 6D is a partial side view representing a third open position of the door of FIG. 6A.

Referring specifically to FIG. 6D, the door 306 is in a third open position. In this position, the lock key 420 is rotated to an approximately 135-degree angle from the closed position. Here, the main body 426 continues to rotate within the pin aperture 572, with the locking tab 428 continuing to be secured within the pin aperture 572.

Figure 7A:
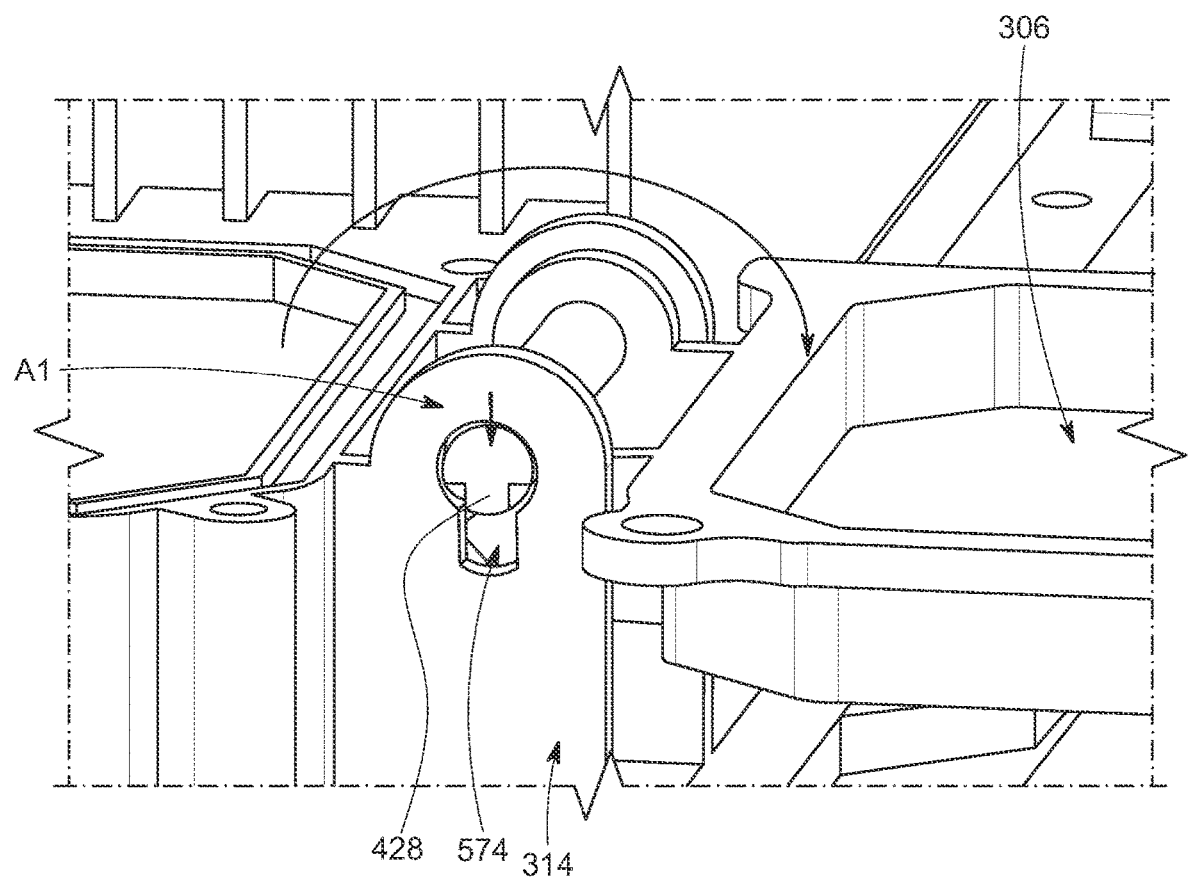
FIG. 7A is a partial perspective view of the telecommunication device of FIG. 6A illustrating the door in a closed position.
Figure 7B:
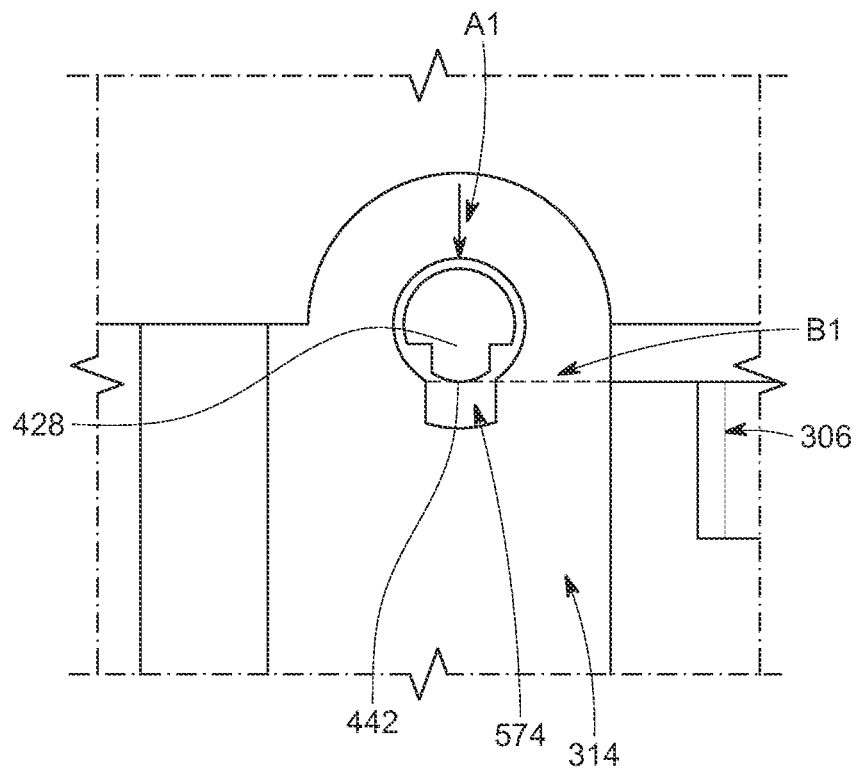
FIG. 7B is a partial side view representing a locking mechanism of the telecommunication device of FIG. 7A prior to securing the door in a fixed position.
Figure 7C:
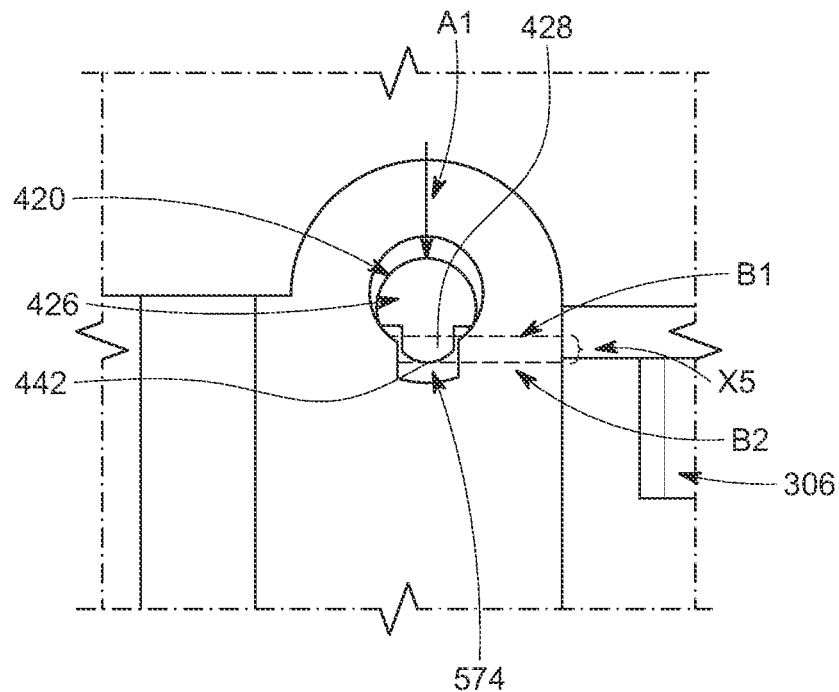
FIG. 7C is a partial side view representing the locking mechanism of FIG. 7B after securing the door in the fixed position.

Referring generally to FIGS. 7A-7C, the door 306 is in a fourth open position. In the illustrated example, this position is at an approximately 180-degree angle relative to the closed position. In this position, the locking tab 428 is now aligned with the pin aperture 572. Referring specifically to FIGS. 7A and 7B, the locking tab 428 is illustrated prior to fixing (or locking) the door 306 in a fixed position relative to the base assembly 314. In other words, as described in more detail below, the locking tab 428 is illustrated prior to moving in the direction of arrow A1 towards the lock aperture 574. Referring specifically to FIG. 7B, upon achieving rotational alignment between the locking tab 428 and the lock aperture 574, the top surface 442 of the locking tab 428 is at a first position B1.

Referring now specifically to FIG. 7C, the alignment of the locking tab 428 with the lock aperture 574 results in automatic movement of the lock key 420. Specifically, gravity causes the now-unrestricted lock key 420 to fall into the lock aperture 574 in the direction of arrow A1. As the lock key 420 falls into the lock aperture 574, the top surface 442 moves a distance X5 from the first position B1 to a second position B2. Consequently, rotation of the door 306 is restricted because the lock key 420 is self-locked in the lock aperture 574. The self-locking is, thus, a result of (i) rotating the door and (b) force of gravity causing the locking of the lock key 420 when the intended alignment is achieved. To close the door 306, the lock key 420 is lifted (e.g., by lifting the entire door 306), in a direction opposite to arrow A1. Then, the door 306 is free to rotate back towards the closed position (illustrated in FIG. 3B).

The above description in reference to FIGS. 6A-7C represent a configuration in which the telecommunication device 300 (illustrated in FIGS. 3A and 3B) is installed in a horizontal configuration. More specifically, the hinge pin 416 (illustrated in FIG. 4A) is in a horizontal orientation. The description below describes a vertical configuration.

Figure 8A:
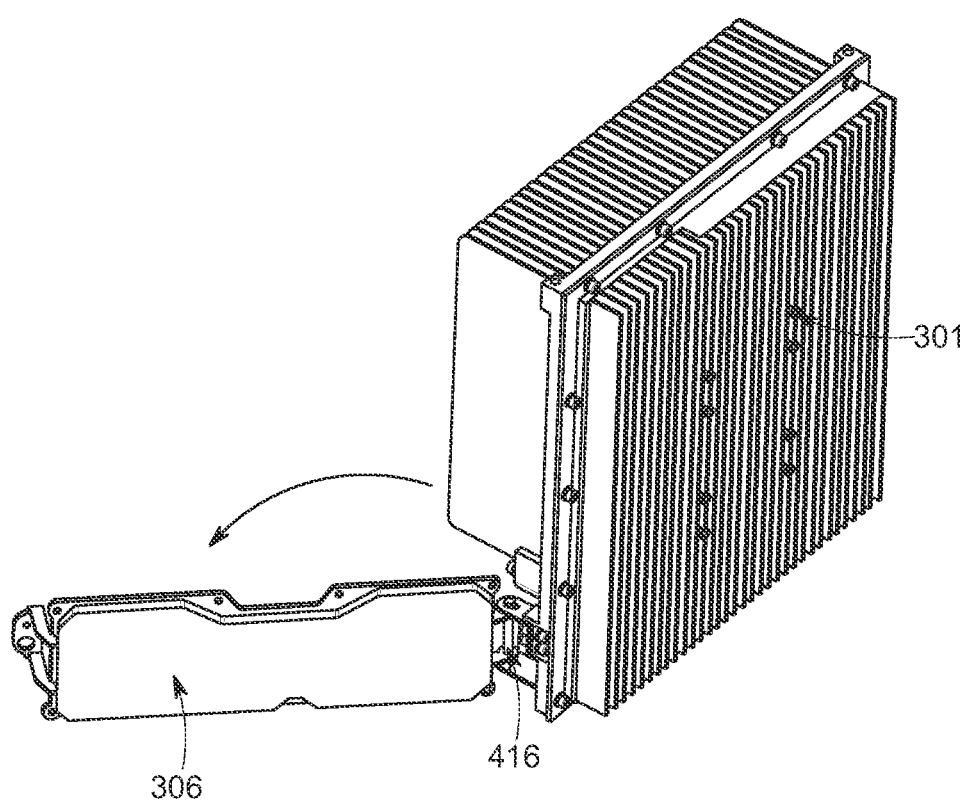
FIG. 8A is a perspective view of the telecommunication device of FIG. 3A illustrating a door in a first open position, the telecommunication device being in a vertical configuration.

Referring generally to FIGS. 8A-8G, the door 306 is now vertically coupled to the main body 301 (FIG. 8A). As illustrated in FIGS. 8A, 8B, 8D, and 8F, the hinge pin 416 is in a vertical orientation. Similar to the above horizontal configuration, the door 306 is generally free to rotate between a plurality of positions. However, in the vertical configuration, the second key 424 (FIGS. 8C, 8E, and 8F) secures the door 306 in the fixed position. As illustrated more clearly in FIGS. 8C, 8E, and 8G, the rotation of the door 306 is facilitated by rotation of the lock key 420 relative to the pin aperture 572.

Figure 8B:
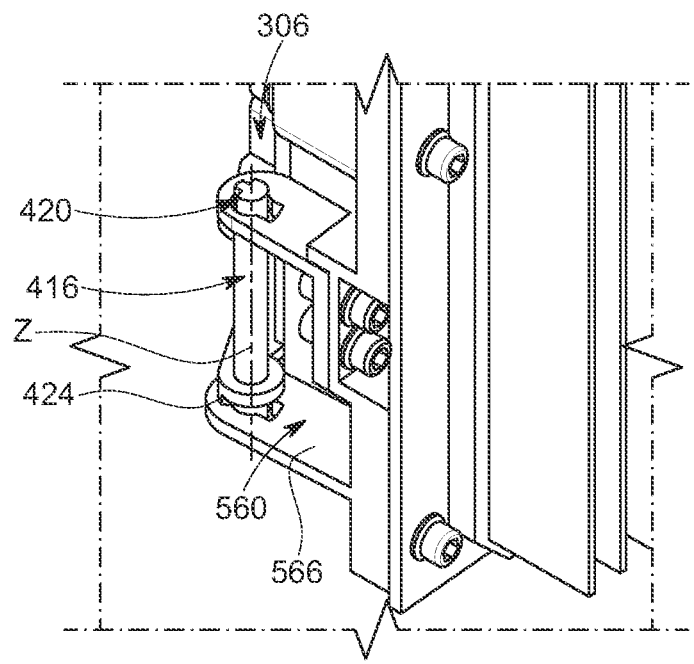
FIG. 8B is a partial perspective view representing a first open position of the door of FIG. 8A.
Figure 8C:
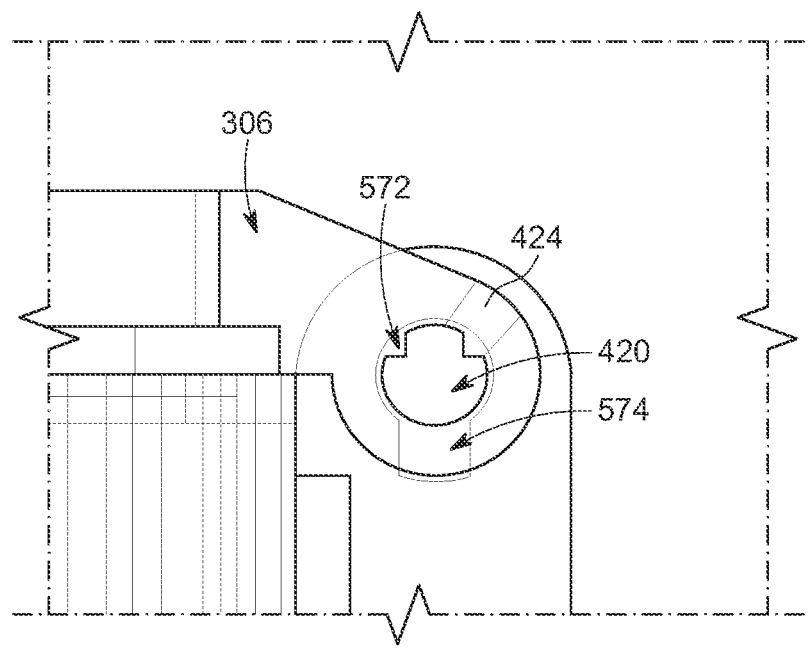
FIG. 8C is a partial bottom view representing the first open position of FIG. 8B.

Referring specifically to FIGS. 8B and 8C, the door 306 is in the closed position. In FIG. 8B the second key 424 is located internal to and in contact with the internal surface 566 of a corresponding base plate 560. Thus, the second key 424 is blocked by solid material of the base plate 560 from moving along the central axis Z. Nevertheless, the second key 424 is free to rotate when the door 306 rotates. In FIG. 8C, the second key 424 is out of alignment with the lock aperture 574. Thus, in the closed position, the door 306 is free to rotate to one of the open positions.

Figure 8D:
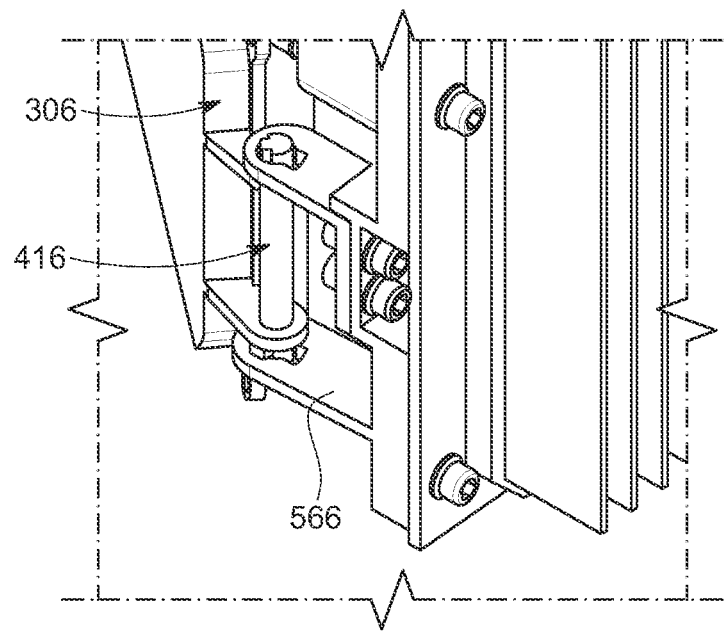
FIG. 8D is a partial perspective view representing a second open position of the door of FIG. 8A.
Figure 8E:
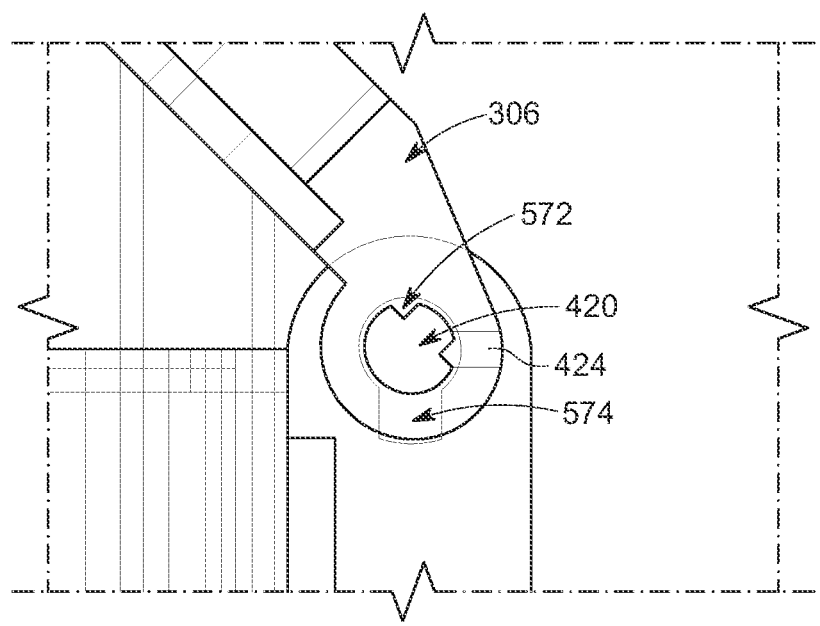
FIG. 8E is a partial bottom view representing the second open position of FIG. 8D.

Referring specifically to FIGS. 8D and 8E, the door 306 is now in a first open position. In FIG. 8D the second key 424 is rotated clockwise from the closed position (FIGS. 8B and 8C) to a position approximately 45 degrees from the closed position. The second key 424 rotates internally along the internal surface 566. In FIG. 8E, the second key 424 continues to be out of alignment with the lock aperture 574. Thus, the door 306 is free to continue rotating to another one of the open positions.

Figure 8F:
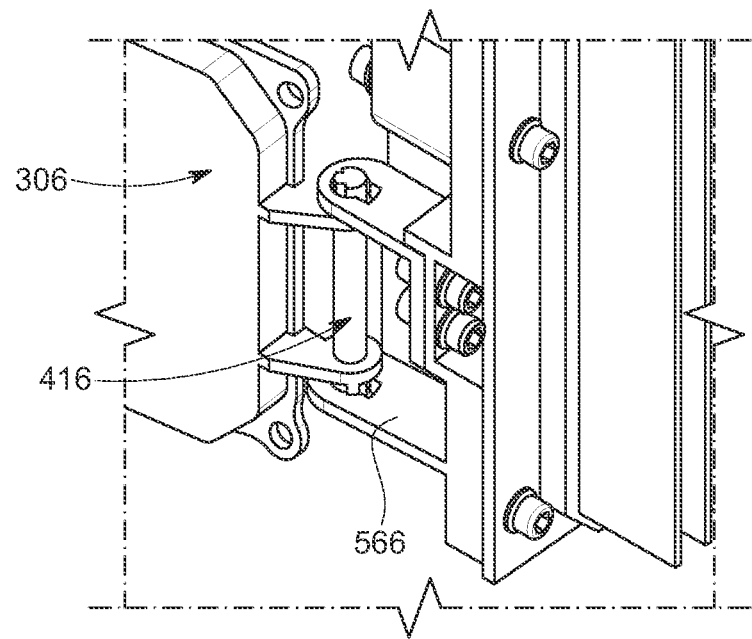
FIG. 8F is a partial perspective view representing a third open position of the door of FIG. 8A.
Figure 8G:
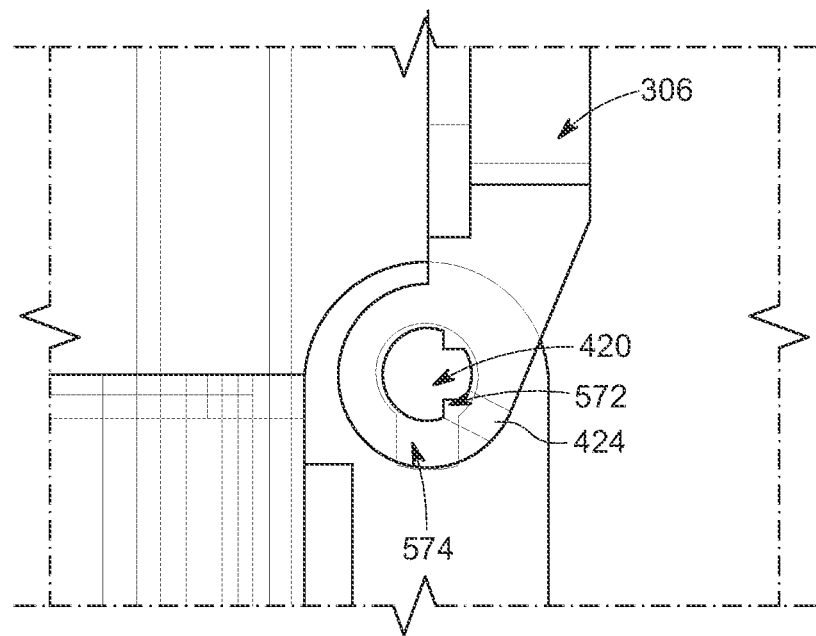
FIG. 8G is a partial bottom view representing the third open position of FIG. 8F.

Referring specifically to FIGS. 8F and 8G, the door 306 is now in a second open position. In FIG. 8F, the second key 424 is rotated clockwise to a position approximately 90 degrees from the closed position (FIGS. 8B and 8C). The second key 424 continues to rotate internally along the internal surface 566. In FIG. 8G, the second key 424 continues to be out of alignment with the lock aperture 574. Thus, the door 306 is free to continue rotating to another one of the open positions.

Referring generally to FIGS. 9A-9D, the door 306 (FIGS. 9A and 9C) is in a third open position. In the illustrated example, this position is at an approximately 135-degree angle relative to the closed position (FIGS. 8B and 8C). As described in more detail below, the second key 424 is free to move in the direction of Arrow A2 for fixing the door 306 in a fixed position.

Figure 9A:
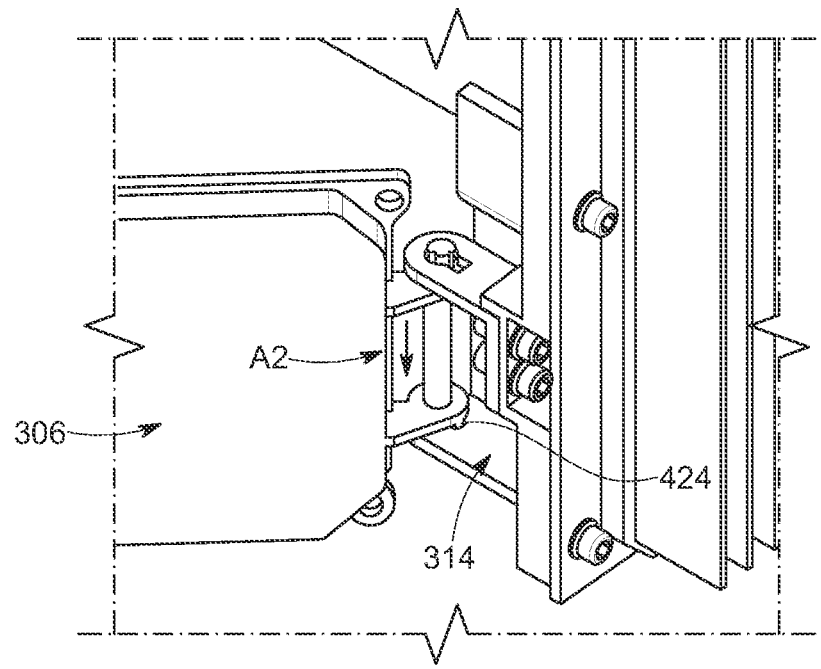
FIG. 9A is a partial perspective view representing the locking mechanism of the telecommunication device of FIG. 8A prior to securing the door in the fixed position.
Figure 9B:
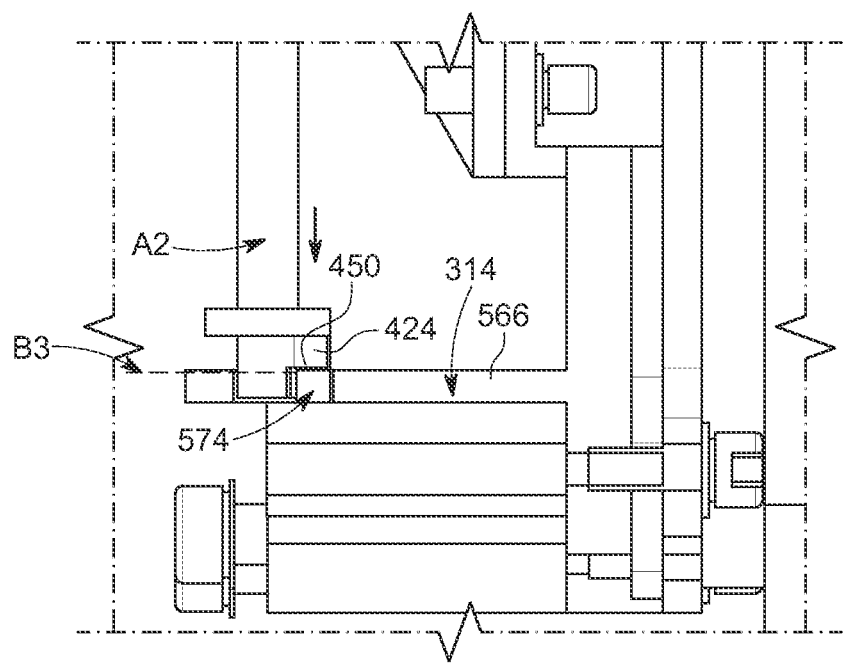
FIG. 9B is a partial side view representing the locking mechanism of FIG. 9A.

Referring specifically to FIGS. 9A and 9B, the second key 424 is illustrated prior to locking the door in the fixed position relative to the base assembly 314. In other words, the second key 424 is illustrated prior to moving in the direction of arrow A2. Referring specifically to FIG. 9B, upon achieving rotational alignment between the second key 424 and the lock aperture 574, the end surface 450 of the second key 424 is at a first position B3.

Figure 9C:
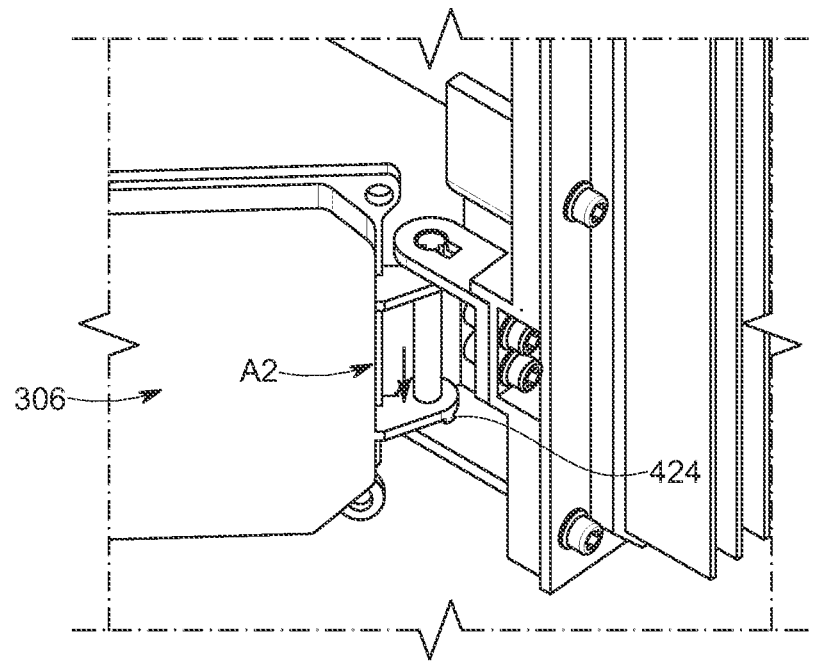
FIG. 9C is a partial perspective view representing the locking mechanism of FIG. 9A after securing the door in the fixed position.
Figure 9D:
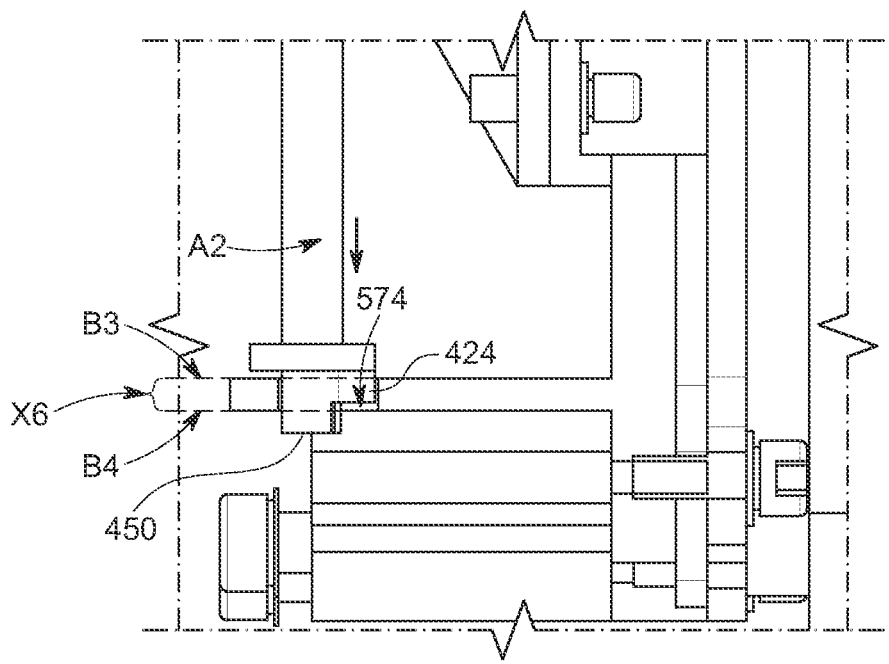
FIG. 9D is a partial side view representing the locking mechanism of FIG. 9C.

Referring specifically to FIGS. 9C and 9D, the alignment of the second key 424 with the lock aperture 574 (FIG. 9D) results in automatic movement of the second key 424. In FIG. 9D, gravity causes the now-unrestricted second key 424 to fall into the lock aperture 574 in the direction of arrow A2. As the second key 424 falls into the lock aperture 574, the end surface 450 moves a distance X6 from the first position B3 to a second position B4. Consequently, rotation of the door 306 (FIG. 9C) is restricted because the second key 424 is now self-locked in the lock aperture 574. To close the door 306, the second key 424 is lifted (e.g., by lifting the entire door 306), in a direction opposite to arrow A2. Then, the door 306, is free to rotate back towards the closed position (FIGS. 8B and 8C).

According to alternative configurations, the telecommunication device described above is further applicable to non-horizontal or non-vertical arrangements. The horizontal or vertical arrangements described above are intended to further apply to angled arrangements. The force of gravity causes the locking of the respective key when a corresponding alignment occurs.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A telecommunication device comprising:
   a main body;
   a compartment attached to the main body for receiving one or more components;
   a door rotatable relative to the compartment between a closed position and a plurality of open positions, the door covering the compartment in the closed position; and
   a connecting assembly attaching the door to the compartment, the connecting assembly including a locking mechanism for preventing rotation of the door in a fixed position, the fixed position corresponding to an open position of the plurality of open positions, the locking mechanism self-locking in the fixed position when the door rotation reaches the fixed position;
   wherein the connecting assembly includes a hinge pin and a hinge base, the hinge base including two base plates between which the hinge pin is rotatably mounted;
   wherein the locking mechanism includes a lock key and a lock aperture, the lock key being formed on at least one end of the hinge pin, the lock aperture being formed on at least one of the base plates;

wherein the lock key is received within the lock aperture when rotation of the door causes alignment between the lock key and the lock aperture;

wherein the lock key includes a first key and a second key, the first key being received within the lock aperture when the hinge pin is in a generally horizontal orientation, the second key being received within the lock aperture when the hinge pin is in a generally vertical orientation; and wherein the first key extends from an end of the hinge pin at a first distance, the second key extending from the end of the hinge pin at a second distance, the first distance being greater than the second distance.

2. The telecommunication device of claim 1, wherein the telecommunication device is a base station for a cellular network.

3. The telecommunication device of claim 1, wherein the one or more components include one or more components selected from a group consisting of an output cable, a light emitting diode (LED) indicator, and a maintenance button.

4. The telecommunication device of claim 1, wherein the compartment is selected from a group consisting of a maintenance box and a cable-routing box.

5. The telecommunication device of claim 1, wherein the lock key is received within the lock aperture in response to force of gravity.

6. The telecommunication device of claim 1, wherein the first key has a circular main body from which a locking tab extends, the locking tab being centrally positioned relative to a center point of the main body, the locking tab being narrower than a body diameter of the main body.

7. The telecommunication device of claim 6, wherein the end of the hinge pin has an outer circular periphery that has an outer diameter, the outer diameter being greater than the body diameter.

8. The telecommunication device of claim 6, wherein the second key is oriented at a different angle relative to the first key, the angle being in a perpendicular end plane relative to a central axis of the hinge pin, the second key having an outer circular surface with a second key diameter that is generally the same as the outer diameter.

9. The telecommunication device of claim 1, wherein the lock aperture is continuously connected to a pin aperture, the end of the hinge pin being inserted through the pin aperture.

10. The telecommunication device of claim 9, wherein the lock aperture has a cross-sectional width that is smaller than a hinge diameter of the pin aperture.

11. A telecommunication device comprising:

a main body;

a compartment attached to the main body for receiving one or more components;

a door rotatable relative to the compartment between a closed position and a plurality of open positions, the door covering the compartment in the closed position; and a connecting assembly attaching the door to the compartment, the connecting assembly including a hinge base with two base plates fixed in generally parallel positions relative to each other, the two base plates being generally identical to and offset from each other, each base plate of the two base plates having a pin aperture continuously connected to a lock aperture;

a hinge pin having a cylindrical body extending between two opposing ends, each of the two opposing ends being rotatably inserted through a respective pin aperture;

a first key extending from each end of the hinge pin along central axis; and a second key extending from each end of the hinge pin along the central axis, the second key being oriented at a different angle than the first key in a perpendicular end plane relative to the central axis, the second key extending a smaller distance than the first key.

12. The telecommunication device of claim 11, wherein the first key is received within the lock aperture, in response to the force of gravity, when rotation of the hinge pin causes alignment between the first key and the lock aperture.

13. The telecommunication device of claim 11, wherein the second key is received within the lock aperture, in response to the force of gravity, when rotation of the hinge pin causes alignment between the second key and the lock aperture.

14. The telecommunication device of claim 11, wherein the first key has a first outer periphery defined in part by a first diameter, the second key having a second outer periphery that is defined in part by a second diameter, the second diameter being greater than the first outer periphery.

15. The telecommunication device of claim 11, wherein the first key extends along the central axis a greater distance than the second key.

* * * * *